United States Patent
Yu

(10) Patent No.: US 9,541,038 B2
(45) Date of Patent: Jan. 10, 2017

(54) MODULE APPLYING A HYDROGEN GENERATING DEVICE FOR SUPPORTING COMBUSTION OF AN INTERNAL COMBUSTION ENGINE

(71) Applicant: China New Energy Technology Co., Ltd., Taoyuan (TW)

(72) Inventor: Shou-Pin Yu, Taoyuan (TW)

(73) Assignee: CHINA NEW ENERGY TECHNOLOGY CO., LTD., Taoyuan (TW)

( * ) Notice: Subject to any disclaimer, the term of this patent is extended or adjusted under 35 U.S.C. 154(b) by 78 days.

(21) Appl. No.: 14/622,471

(22) Filed: Feb. 13, 2015

(65) Prior Publication Data

US 2016/0237957 A1  Aug. 18, 2016

(51) Int. Cl.
*F02M 25/12* (2006.01)
*C01B 3/36* (2006.01)

(52) U.S. Cl.
CPC .............. *F02M 25/12* (2013.01); *C01B 3/36* (2013.01); *C01B 2203/1235* (2013.01); *C01B 2203/84* (2013.01)

(58) Field of Classification Search
CPC .......... F02D 25/02; F02D 21/00; B60K 6/387; B60K 6/48; C01B 3/36
See application file for complete search history.

(56) References Cited

U.S. PATENT DOCUMENTS

2003/0221949 A1* 12/2003 Rabinovich ............ B01J 19/088
204/164

FOREIGN PATENT DOCUMENTS

TW              M484630 U       8/2014

\* cited by examiner

*Primary Examiner* — Lindsay Low
*Assistant Examiner* — Kevin Lathers
(74) *Attorney, Agent, or Firm* — Muncy, Geissler, Olds & Lowe, P.C.

(57) ABSTRACT

A module applying a hydrogen generating device for supporting combustion of an internal combustion engine is provided. A hydrogen generating device of the module primarily utilizes a plasma column to assist air and a hydrogen-containing substance to produce a plasma chemical reaction, such a hydrogen component is decomposed from the hydrogen-containing substance and transported into an internal combustion engine. Thus, combustion of the internal combustion engine can be promoted.

3 Claims, 2 Drawing Sheets

MODULE APPLYING A HYDROGEN GENERATING DEVICE FOR SUPPORTING COMBUSTION OF AN INTERNAL COMBUSTION ENGINE

FIELD OF THE INVENTION

The present invention relates to a module applying a hydrogen generating device for supporting combustion of an internal combustion engine, and particularly, to a module applying a hydrogen generating device for supporting combustion of an internal combustion engine by utilizing a plasma chemical reaction.

BACKGROUND OF THE INVENTION

Hydrogen, a flammable, colorless, odorless and highly chemically active gas, has a rich content and is mainly applied in the field of basic chemical synthesis. In the recent years, development trends of hydrogen are also targeted at being a substitute energy. In addition to the foregoing applications, based on properties of having high chemical activities and being easily combined with a carbon substance, industrialists may further apply hydrogen for removing carbon deposition in an internal combustion engine to enhance operating efficiency of the internal combustion engine.

Principles of an internal combustion engine are described briefly as follows. A fuel source is inputted into an internal combustion engine and is mixed with hydrogen for combustion. During the process, chemical energy obtained is converted to mechanical energy. According to different types of fuel sources, these fuel sources may be applied to gasoline engines, diesel engines and biomass energy engines, as well as to equipments of various fields such as motor bikes, automobiles, ships, airplanes and rockets. Most fuels include compositions of hydrocarbon compounds. As a result, during the operation process of an internal combustion engine, carbon particles are often accumulated and deposited as the abovementioned carbon deposition. The carbon deposition may degrade the performance of the engine, or even damage and lead to malfunctions of the engine in more severe cases.

There are conventional methods that introduce hydrogen into an internal combustion engine to remove carbon deposition. For example, the Taiwan Patent No. M484630 discloses "Device that Removes Carbon Deposition of Fuel Engine by Hydrogen or Mixed Gas of Hydrogen and Nitrogen". In the above disclosure, a device, which removes carbon deposition of a fuel engine by hydrogen or a mixed gas of hydrogen and nitrogen, directly stores the hydrogen or the mixed gas of hydrogen and nitrogen in a steel bottle or another container, and introduces the hydrogen or the mixed gas of hydrogen and nitrogen to a fuel engine to remove carbon deposition in the fuel engine.

In current technologies, industrial methods for manufacturing hydrogen are employed as a source for hydrogen, and mainly adopt steam reforming as such approach has higher conversion efficiency. However, such approach involves high-temperature operations or has innate chemical reactions yielding high pollutions that lead to environmental damages. On the other hand, with the industrial methods for manufacturing hydrogen, general users can only purchase and then store the hydrogen for further utilization. Thus, not only the above technologies for removing carbon deposition cannot be extensively disseminated and promoted, but also various application inconveniences are resulted.

SUMMARY OF THE INVENTION

The primary object of the present invention is to solve issues of environment pollution caused by a conventional hydrogen manufacturing method as well as manufacturing and acquisition inconveniences of a conventional method that utilizes hydrogen for removing carbon deposition.

To achieve the above object, the present invention provides a module applying a hydrogen generating device for supporting combustion of an internal combustion engine. The device includes a hydrogen generating device and an internal combustion apparatus. The hydrogen generating device includes a housing, a plasma generating unit, a feeding unit and a gas exhausting unit. The housing includes a first opening, a second opening disposed opposite the first opening, and a cavity. The cavity is formed in the housing, is in communication with the first opening and the second opening, and is at least partially filled with air. The plasma generating unit is located in the cavity, and includes a first electrode located closely to the first opening and a second electrode located closely to the second opening. A potential difference is present between the first electrode and the second electrode to generate a plasma. The feeding unit is located outside the cavity and closely to the first opening, and supplies a hydrogen-containing substance via the first opening into the cavity. The gas exhausting unit is located outside the cavity and closely to the second opening, and causes the air in the cavity via the second opening to generate an airflow that flows from the first opening towards the second opening. Thus, the plasma between the first electrode and the second electrode is affected by the airflow to form a plasma column. The internal combustion apparatus includes an internal combustion engine that is communication with the second opening via the gas exhausting unit. The gas and the hydrogen-containing substance are mixed between the first electrode and the second electrode, and receive an effect of the plasma column between the first electrode and the second electrode to produce a plasma chemical reaction, such that a hydrogen component is decomposed from the hydrogen-containing substance and transported into the internal combustion engine via the second opening.

In one embodiment of the present invention, the hydrogen-containing substance is selected from a group consisting of gasoline, diesel, biomass diesel, alcohol and ammonium.

It is seen from the above description that, compared to the prior art, the present invention provides following effects. In the present invention, the plasma column is utilized to assist decomposing the hydrogen component from the hydrogen-containing substance to provide a hydrogen source. The present invention does not involve high temperature or high pollution plasma chemical reactions, and causes minimal damage to the environment. Further, by inputting the hydrogen-containing substance such as gasoline, diesel, biomass diesel or ammonia, a user is allowed to independently manufacture the hydrogen component for removing carbon deposition, thereby providing application as well as independent manufacturing conveniences.

DETAILED DESCRIPTION OF THE PREFERRED EMBODIMENTS

The foregoing, as well as additional objects, features and advantages of the invention will be more readily apparent from the following detailed description, which proceeds with reference to the accompanying drawings.

Figure 1:
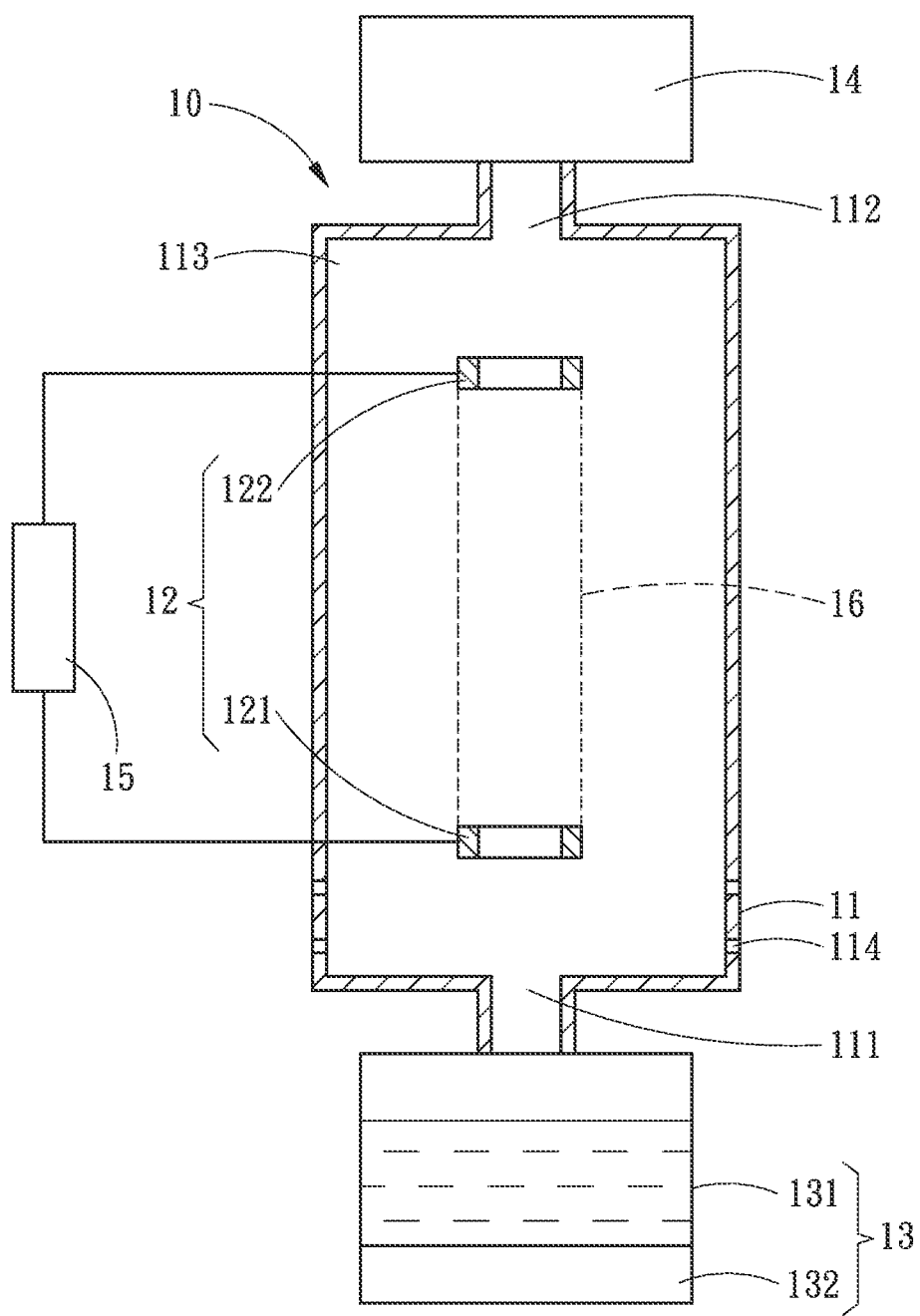
FIG. 1 is a schematic diagram of a hydrogen generating device of the present invention.
Figure 2:
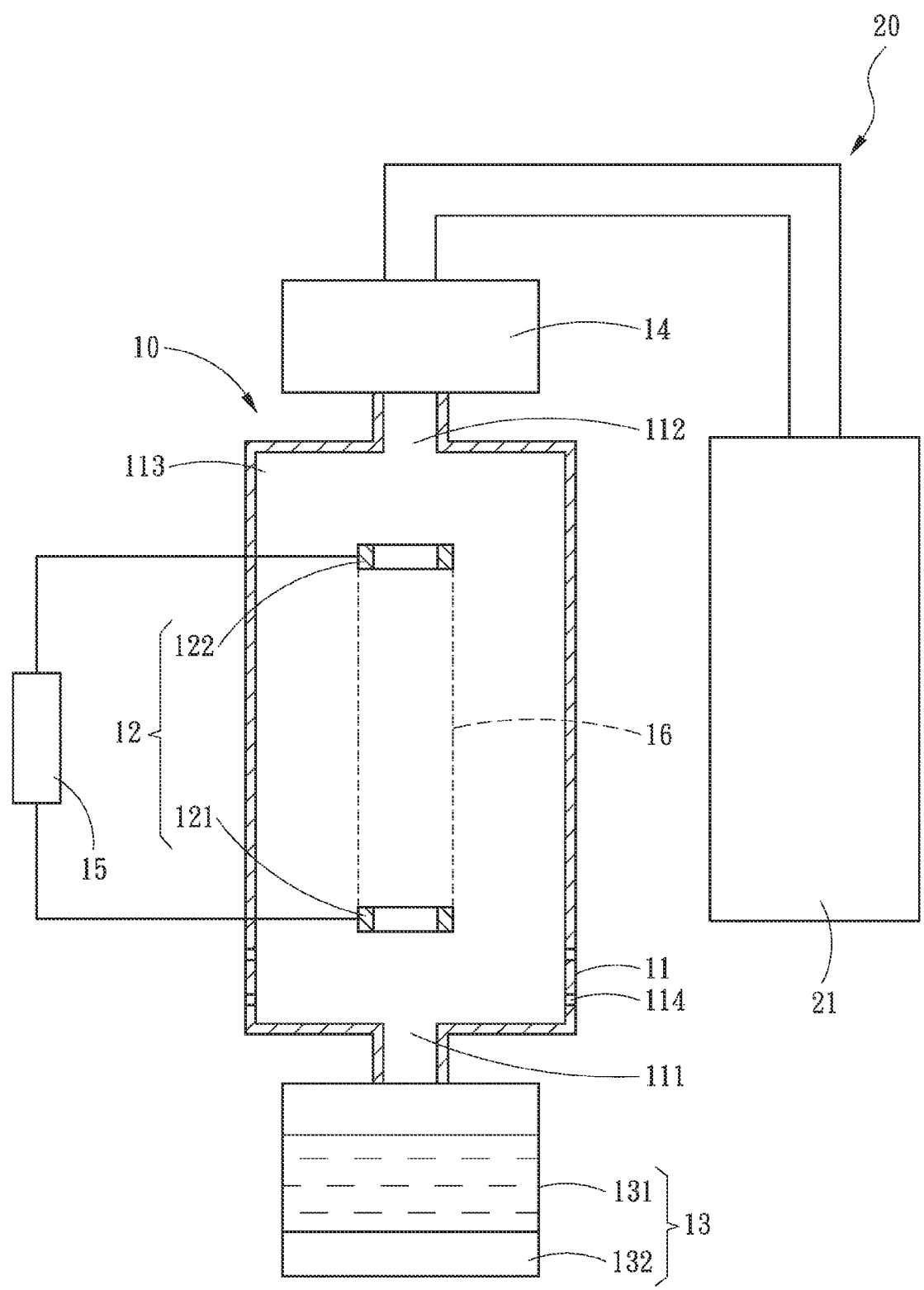
FIG. 2 is a schematic diagram according to an embodiment of the present invention.

FIG. 1 is a schematic diagram of a hydrogen generating device of the present invention. FIG. 2 is a schematic diagram of an embodiment of the present invention. Referring to FIG. 1 and FIG. 2, the present invention provides a module applying a hydrogen generating device for supporting combustion of an internal combustion engine. The module includes a hydrogen generating device 10 and an internal combustion apparatus 20. The hydrogen generating device 10 includes a housing 11, a plasma generating unit 12, a feeding unit 13 and a gas exhausting unit 14. The housing 11 includes a first opening 111, a second opening 112 disposed opposite the first opening 111, a cavity 113 formed in the housing 11 and being in communication with the first opening 111 and the second opening 112, and a plurality of third openings 114 in communication with the cavity 113 and an exterior to allow air to enter the cavity 113. The cavity 113 is at least partially filled with the air. In the embodiment, the housing 11 is a vortex column body, and first opening 111 and the second opening 112 respectively form a top end and a bottom end of the housing 11, diameters of the first opening 111 and the second opening 112 are preferably between 20 mm and 31 mm, and the third openings 114 penetrate through a surrounding wall of the housing 11 and are distributed along a circumference of the housing 11.

The plasma generating unit 12 is located in the cavity 113, and includes a first electrode 121 and a second electrode 122. The first electrode 121 is secured closely to the first opening 111, and the second electrode 112 is secured closely to the second opening 112. In the embodiment, the first electrode 121 and the second electrode 122 are connected to a voltage supply unit 15. The voltage supply unit 15 outputs a high frequency power to cause a potential difference between the first electrode 121 and the second electrode 122 to further produce a plasma. The high frequency power preferably has a frequency between 2 kHz and 20 kHz, and a voltage between 4000V and 14000V. In the embodiment, the third openings 114 are preferably located at a height lower than the first electrode 121.

The feeding unit 13 is located outside the cavity 113 and closely to the first opening 111, and supplies a hydrogen-containing substance into the cavity 113. As shown in FIG. 1, the hydrogen-containing substance enters the cavity 113 via the first opening 111. The gas exhausting unit 14 is located outside the cavity 113 and closely to the second opening 112. In one embodiment of the present invention, the feeding unit 13 includes an accommodating chamber 131 and an oscillator 132. The accommodating chamber 131 accommodates the hydrogen-containing substance. More particularly, the hydrogen-containing substance is in a liquid state, and the oscillator 132 is in contact with the hydrogen-containing substance. The oscillator 132 may be implemented by a piezoelectric element that generates high frequency oscillations, and the hydrogen-containing substance in a liquid state accordingly forms a plurality of minute liquid particles that drift in the cavity 113 or enter the cavity 113 along with the airflow. The gas exhausting unit 14 may be an exhaust fan, and causes the air in the cavity 113 via the second opening 112 to produce an airflow as a strong vortex that flows from the first opening 111 towards the second opening 112. As such, the plasma between the first electrode 121 and the second electrode 122 is affected by the airflow to form a plasma column 16. The airflow is a cyclonic airflow field. In the present invention, the hydrogen-containing substance may be a liquid such as gasoline, diesel, biomass diesel or alcohol, or a gaseous substance, e.g., a nitrogen-containing gas such as NH3 or CH4. In one embodiment of the present invention, the first electrode 121 and the second electrode 122 are preferably hollow circular structures, such that the airflow is allowed to pass through center holes of the hollow circular structures. It should be noted that the above form of the first electrode 121 and the second electrode 122 is an example for explaining the present invention, and is not to be construed as a limitation to the present invention.

The internal combustion apparatus 20 includes an internal combustion engine 21 that is in communication with the second opening 112 via the gas exhausting unit 14. As the internal combustion engine 21 is in communication with the second opening 112 of the hydrogen generating device 10, the hydrogen component is allowed to enter the internal combustion engine 21 via the gas exhausting unit 14. When the embodiment is implemented to an application such as a vehicle, a negative pressure naturally generated during gas intake into an engine of the vehicle can serve as the gas exhausting unit 14. However, the gas exhausting unit 14 may also be additionally provided in the vehicle.

In the present invention, the air and the hydrogen-containing substance are mixed between the first electrode 121 and the second electrode 122 to receive an effect of the plasma column 16 between the first electrode 121 and the second electrode 122 to further produce a plasma chemical reaction, such that the hydrogen component is decomposed from the hydrogen-containing substance and transported into the internal combustion engine 21 via the second opening 112. Diesel is taken as an example below for illustration purposes. During operations, when the air is present in the cavity 113, the plasma column 16 is formed between the first electrode 121 and the second electrode 122, as previously described. The plasma column 16 contains many high energy charged particles in a free state. When entering the cavity 113 via the feeding unit 13, the hydrogen-containing substance is collided by the charged particles, such that hydrocarbon bonds are damaged to generate the hydrogen component. For example, in the embodiment, the chemical reaction of the plasma is as below:

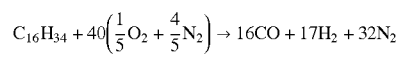

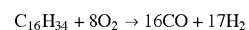

As such, the hydrogen component is discharged via the second opening 112 along with the airflow.

In conclusion, in the present invention, the plasma column is formed to produce the plasma chemical reaction of the hydrogen-containing substance and oxygen in the air, so as to further decompose the hydrogen component from the hydrogen-containing substance to remove carbon deposition. During the above process, as high temperature or high pollution reactions are not involved, the present invention is more environmental friendly compared to the prior art. Further, when the hydrogen generating device is integrated with the internal combustion engine, a user may input various kinds of hydrogen-containing substances to independently produce the hydrogen component for removing carbon deposition, thereby providing utilization and manufacturing conveniences.

What is claimed is:

1. A module applying a hydrogen generating device for supporting combustion of an internal combustion engine, comprising:
   a hydrogen generating device, comprising:
      a housing, comprising a first opening, a second opening disposed opposite the first opening, a cavity formed in the housing and being in communication with the first opening and the second opening and at least partially filled with air, and a plurality of third openings in communication with the cavity and an exterior to allow the air to enter the cavity;
      a plasma generating unit, located in the cavity, comprising a first electrode located closely to the first opening, a second electrode located closely to the second opening, a potential difference being present between the first electrode and the second electrode to produce a plasma;
      a feeding unit, located outside the cavity and closely to the first opening, for supplying a hydrogen-containing substance into the cavity via the first opening; and
      a gas exhausting unit, located outside the cavity and closely to the second opening, for causing the air in the cavity via the second opening to produce an airflow that flows from the first opening towards the second opening, such that the plasma between the first electrode and the second electrode is affected by the airflow to form a plasma column; and
   an internal combustion apparatus, connected to the gas exhausting unit, comprising an internal combustion engine that is in communication with the second opening via the gas exhausting unit;
   wherein the air and the hydrogen-containing substance are mixed between the first electrode and the second electrode to receive an effect of the plasma column between the first electrode and the second electrode, such that a hydrogen component is decomposed from the hydrogen-containing substance and transported into the internal combustion engine via the second opening;
   wherein the hydrogen-containing substance is in a liquid state; and the feeding unit comprises an accommodating chamber accommodating the hydrogen-containing substance, and an oscillator disposed in the accommodating chamber and being in contact with the hydrogen-containing substance.

2. The module applying a hydrogen generating device for supporting combustion of an internal combustion engine of claim 1, wherein the hydrogen-containing substance is selected from a group consisting of gasoline, diesel, biomass diesel, alcohol and ammonia.

3. The module applying a hydrogen generating device for supporting combustion of an internal combustion engine of claim 1, further comprising:
   a voltage supply unit, connected between the first electrode and the second electrode, for providing an alternating current to the first electrode and the second electrode, the alternating current having a frequency between 2 kHz and 20 kHz and a voltage between 4000V and 14000V.

* * * * *